(12) United States Patent
Nogi et al.

(10) Patent No.: US 9,312,717 B2
(45) Date of Patent: Apr. 12, 2016

(54) ELECTRIC ENERGY STORAGE DEVICE AND INSTALLATION-OPERATION METHOD THEREOF

(75) Inventors: Masayuki Nogi, Hachioji (JP); Ryo Takagi, Musashino (JP); Koji Ootsuji, Yokohama (JP); Mitsuhiko Matsui, Minoo (JP); Satoshi Koizumi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 307 days.

(21) Appl. No.: 13/985,455

(22) PCT Filed: Feb. 14, 2012

(86) PCT No.: PCT/JP2012/053440
§ 371 (c)(1),
(2), (4) Date: Nov. 21, 2013

(87) PCT Pub. No.: WO2012/111679
PCT Pub. Date: Aug. 23, 2012

(65) Prior Publication Data
US 2014/0070770 A1    Mar. 13, 2014

(30) Foreign Application Priority Data

Feb. 14, 2011  (JP) .................................. 2011-028188

(51) Int. Cl.
*H02J 7/00* (2006.01)
*B60M 3/06* (2006.01)
(Continued)

(52) U.S. Cl.
CPC .................. *H02J 7/0068* (2013.01); *B60L 9/04* (2013.01); *B60L 11/007* (2013.01);
(Continued)

(58) Field of Classification Search
CPC ............ Y02T 10/7005; Y02T 10/7044; B60L 11/1861; B60L 2210/30; B60W 10/26; B60W 2510/244; B60W 2710/244; H02J 2009/067; H02J 7/008; H02J 7/1446; H02J 3/32; H02J 7/0021; H02J 7/0029; H02J 7/0031
USPC .......................... 320/104, 116–118, 132, 160
See application file for complete search history.

(56) References Cited

U.S. PATENT DOCUMENTS 8,030,884 B2 * 10/2011 King et al. ..................... 320/104
8,570,000 B2 * 10/2013 Hori ....................... B60W 10/26
320/104

(Continued)

FOREIGN PATENT DOCUMENTS

JP     2006 62489     3/2006
JP     2006 168390    6/2006

(Continued)

OTHER PUBLICATIONS

International Search Report Issued May 1, 2012 in PCT/JP12/53440 Filed Feb. 14, 2012.
Office Action issued Oct. 24, 2014 in Korean Patent Application No. 10-2013-7022217 (with English translation).

*Primary Examiner* — Nghia Doan
(74) *Attorney, Agent, or Firm* — Oblon, McClelland, Maier & Neustadt, L.L.P.

(57) ABSTRACT

Frequent charging/discharging to an electric energy storage element is suppressed for energy saving and longer lifetime. A transmission-line-side power converter device converts power from a transmission line, and supplies DC power to a feeder line connected to an electric energy storage element. An output current controller connected with a line voltage detector detects the feeder line voltage, and a charging rate detector detects a charging rate of the electric energy storage element. A control table sets charging/discharging start voltages and current saturated voltages based on the detected line voltage and charging rate. The output current controller controls the electric energy storage element to discharge at a high line voltage as the charging rate increase, to suppress charging the electric energy storage element at the low line voltage, and makes discharging difficult at the low line voltage to facilitate charging at the low line voltage as the charging rate decreases.

13 Claims, 6 Drawing Sheets

(51) Int. Cl.
  *B60L 9/04* (2006.01)
  *B60L 11/00* (2006.01)
  *B60L 11/18* (2006.01)

(52) U.S. Cl.
  CPC ........ *B60L 11/1853* (2013.01); *B60L 11/1861* (2013.01); *B60M 3/06* (2013.01); *B60L 2200/26* (2013.01); *B60L 2210/10* (2013.01); *B60L 2240/547* (2013.01); *B60L 2240/549* (2013.01); *Y02T 10/7005* (2013.01); *Y02T 10/705* (2013.01); *Y02T 10/7044* (2013.01); *Y02T 10/7216* (2013.01)

(56) References Cited

U.S. PATENT DOCUMENTS

| | | |
|---|---|---|
| 2003/0102845 A1* | 6/2003 | Aker et al. .................... 320/139 |
| 2011/0043038 A1 | 2/2011 | Tsutsumi et al. |
| 2013/0110338 A1 | 5/2013 | Takao et al. |

FOREIGN PATENT DOCUMENTS

| | | |
|---|---|---|
| JP | 2008 74180 | 4/2008 |
| KR | 10-2009-0126196 A | 12/2009 |
| WO | 2009 107715 | 9/2009 |
| WO | 2012 015042 | 2/2012 |

* cited by examiner

ELECTRIC ENERGY STORAGE DEVICE AND INSTALLATION-OPERATION METHOD THEREOF

CROSS-REFERENCE TO RELATED APPLICATIONS

The present application is the national stage of International application PCT/JP12/053440 filed Feb. 14, 2012, and claims priority to JP 2011-028188 filed on Feb. 14, 2011, the entire contents of each of which are incorporated herein by reference.

TECHNICAL FIELD

The present disclosure relates to an electric energy storage device that is utilized as, for example, a power supply source for a DC electric railroad, and an installation-operation method of such an electric energy storage device.

BACKGROUND ART

Conventionally, DC feeder systems are known as power supply systems for a DC electric railroad. Such DC feeder systems have characteristics that a load change due to start and stop of a railroad vehicle frequently occurs, and the line voltage change is large.

It is typical that DC is produced from an AC power source system using a power converter like a diode rectifier, and power regeneration to the AC power source system at the deceleration of a railroad vehicle cannot be performed without an installation of a regenerative inverter. Hence, when no regenerative inverter is present, it is difficult to perform effective regeneration unless a sufficient load that absorbs regenerative currents from the railroad vehicle is present around the railroad vehicle.

Conversely, even if the regenerative inverter is installed, if there is no load that consumes power regenerated by the inverter in the system, the regenerative power causes a reverse power flow to the power transmission-distribution system of an electric power company, and thus it is difficult for the railway business operator to accomplish an effect of reducing the amount of power to be purchased.

In order to address such a disadvantage, an electric energy storage device that absorbs regenerative power of the vehicle is installed in the feeder system in some cases. This electric energy storage device is capable of absorbing the regenerative power of a railroad vehicle, and also capable of discharging the stored energy. The installation of the electric energy storage device enables a reduction of the input energy of the transformer station for power feeding. Moreover, some electric energy storage devices have a function of suppressing a change in a line voltage. An example prior art document for such an electric energy storage system is as follow:

PRIOR ART DOCUMENT

Patent Document

Patent Document 1: JP 2006-62489 A

The technology disclosed in Patent Document 1 controls the charging/discharging of the electric energy storage device in accordance with a charging rate SOC of an electric energy storage element used in the electric energy storage device and the line voltage. For example, as illustrated in FIG. 11, it is necessary in some cases to set a floating control mode between a discharging start voltage Vc and a charging start voltage Vd for adjustment charging.

According to this conventional technology, when a line voltage V becomes high, a charging current is increased from the charging start voltage Vd to a charging current saturated voltage Ve, and the electric energy storage element SOC is charged by a maximum charging current Ic from the feeder line until the voltage reaches a charging maximum voltage Vf from the charging current saturated voltage Ve. Conversely, when the line voltage V becomes low, the discharging current is increased from the discharging start voltage Vc to a discharging current saturated voltage Vb, and discharging from the electric energy storage element SOC to the feeder line is performed by a maximum discharging current Io until the voltage reaches a discharging maximum voltage Va from the discharging current saturated voltage Vb.

In this case, when the charging rate SOC is at the pre-set value, no charging/discharging current flows within the line voltage range from the discharging start voltage Vc to the charging start voltage Vd in the graph of FIG. 11. According to the conventional technology setting the floating control mode, however, when the charging rate SOC is higher than the pre-set value, a floating current If is caused to flow in the discharging direction (an output current I increases) within the line voltage range from the discharging start voltage Vc to the charging start voltage Vd where no charging/discharging current flows in general. Conversely, when the charging rate SOC is lower than the pre-set value, the floating current If is caused to flow in the charging direction within the line voltage range from the discharging start voltage Vc to the charging start voltage Vd where no charging/discharging current flows in general. Accordingly, the charging/discharging current is controlled so as to maintain the charging rate to be a constant value.

Such a conventional technology is a scheme of adjusting charging/discharging so as to obtain a desired charging rate at a voltage when the feeder line is in a slightly loaded condition. Accordingly, it becomes possible to maintain the charging rate of the electric energy storage element to be an arbitrary value. However, in this case, a current from the rectifier is once accumulated in the electric energy storage element in a slightly loaded condition, and is discharged again. Hence, a charging/discharging loss is caused, which is not suitable from the standpoint of energy saving. Moreover, generally, charging/discharging is not performed within a range from the discharging start voltage Vc to the charging start voltage Vd, however, as a result of the floating control, charging/discharging is performed even within the range. Thus, the charging/discharging cycles of the electric energy storage device increase. This results in the increase of an RMS current, a temperature rise of the electric energy storage element, and the increase of the charging/discharging cycle energy, and thus the lifetime of the element is reduced.

In another way, in order to realize a high-output electric energy storage device, a large number of electric energy storage elements are connected in series and in parallel, but when a large number of elements are connected, there is a disadvantage that the reliability of the device decreases. When a large number of elements are connected in series, basically, a substrate for monitoring the charging rate of each element becomes necessary, and when the respective elements are connected in series and in parallel, the number of this monitoring substrates increases, resulting in a decrease of the reliability of the whole system. Moreover, the use of a large number of elements and monitoring substrates results in the increase of the device costs.

Furthermore, the electric energy storage element used in the electric energy storage device has disadvantages such that the element does not have an excellent durability against heat, and the lifetime of the element is reduced when a deep charging/discharging depth is set. The same is true of the electric circuit substrate with respect to the durability against heat, and heat generation largely affects the lifetime of the substrate, resulting in a reduction of the reliability.

DC power distributing systems other than the feeder system for a DC electric railroad, such as a power distributing system to a drive system of an elevator, and a charging/discharging system of a solar power generation (PV) device, likewise have the same disadvantages.

An embodiment of the present invention has been made in order to address the above-explained disadvantages of the conventional technology. That is, it is an object of an embodiment of the present invention to provide an electric energy storage device which can enhance a reliability and a redundancy, and which can accomplish both long-life of a feeder system and energy saving.

SUMMARY

The present disclosure provides, for example, an electric energy device having the followings:

(1) An electric energy storage element connected to a DC power source via a power converter device.

(2) An output current controller which is connected to the power converter device and which controls charging/discharging current of the electric energy storage element relative to the DC power source.

(3) The output current controller is connected with a voltage detector that detects a voltage of the DC power source, a charging rate detector that detects a charging rate of the electric energy storage element, and a control table having set therein charging/discharging characteristics for setting at least one of a charging start voltage, a discharging start voltage, a charging current saturated voltage and a discharging current saturated voltage of the electric energy storage element based on the voltage of the DC power source detected by the voltage detector and the charging rate of the electric energy storage element detected by the charging rate detector.

(4) The charging/discharging characteristics stored in the control table is set such that at least one of the charging start voltage, the discharging start voltage, the charging current saturated voltage and the discharging current saturated voltage is set to a higher value at higher charging rate of the electric energy storage element than at lower charging rate thereof.

DETAILED DESCRIPTION

Embodiments will be explained below with reference to the accompanying drawings.

[A. First Embodiment]
[Structure of First Embodiment]

A first embodiment will be specifically explained with reference to FIG. 1.

Figure 1:
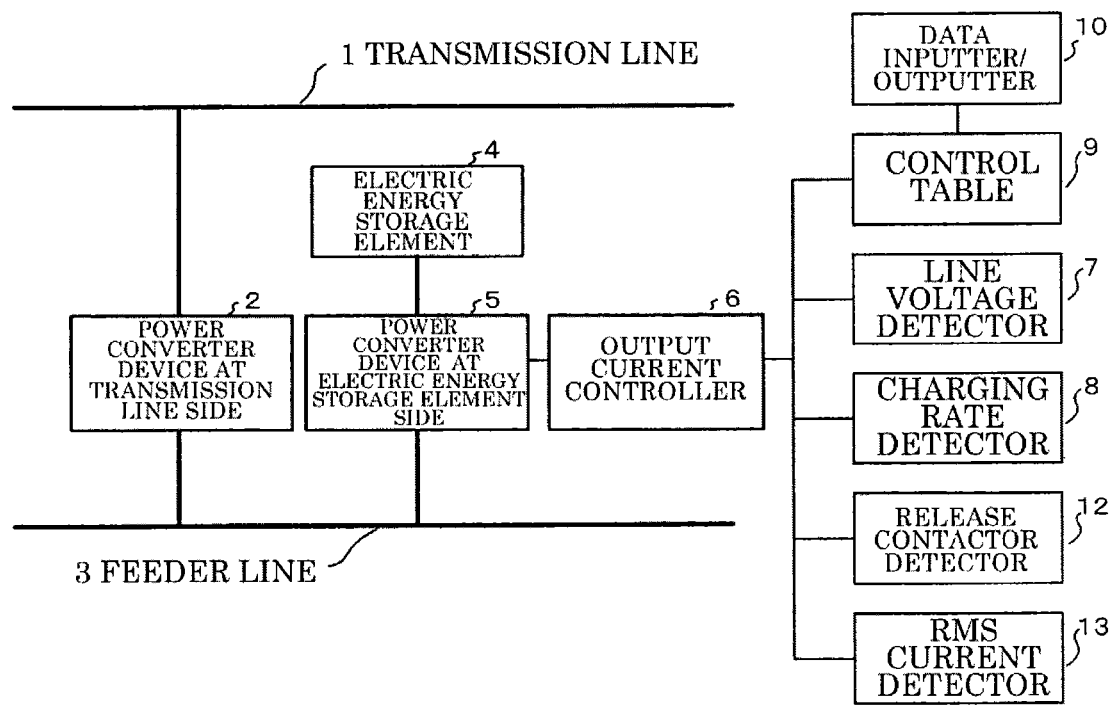
FIG. 1 is a block diagram illustrating a first embodiment.

FIG. 1 illustrates a whole structure of a feeder system including an electric energy storage device according to this embodiment. According to the feeder system of this embodiment, the power from a transmission line 1 is converted by a power converter device 2 at the transmission line side, and the DC power is supplied to a feeder line 3. In this case, the rated voltage of the feeder line 3, that is a DC power source, is a voltage when the power converter device 2 at the transmission-line side is outputting a current that permits a successive operation. The power converter device 2 at the transmission-line-1 side includes a diode rectifier or a PWM converter, etc. Voltages of the feeder line 3 are, for example, DC 600 V, 750 V, 1500V, and DC 3000 V, and a voltage fluctuation occurs at voltages therearound.

The feeder line 3 is connected with an electric energy storage element 4 for storing electric energy through a power converter device 5 provided at the side of the electric energy storage element. The electric energy storage element 4 is, for example, a battery like a lithium-ion battery or a nickel hydride battery. Moreover, an electric double-layer capacitor can be available as the electric energy storage element 4. The power converter device 5 at the side of the electric energy storage element is, for example, a booster/step-down chopper circuit that controls switching elements through respective gates, and is capable of arbitrarily controlling charging/discharging currents to the electric energy storage element 4. The element used for this power converter device 5 is a self-turn-off element like an IGBT, which is subjected to a PWM drive, thereby controlling charging/discharging currents to the electric energy storage element 4. Multiple power converter devices 5 may be connected to the feeder line so as to operate the multiplexed electric energy storage element 4.

Charging/discharging currents (Output Current) input to and output from the electric energy storage element 4 relative to the feeder line 3 by the power converter device 5 at the side of the electric energy storage element is set by an output current controller 6 provided on the power converter device 5. The output current controller 6 is connected with a line-voltage detector 7 that detects a line voltage (Line_Voltage) of the feeder line 3, and is connected with a charging-rate detector 8 that detects a charging rate SOC of the electric energy storage element 4.

The output current controller 6 is connected with a control table 9 which determines, based on the line voltage and the charging rate detected by the line-voltage detector 7 and the charging-rate detector 8, the charging/discharging operations of the electric energy storage element 4, i.e., charging/discharging start voltages (charge_th_Low, discharge_th_high), and charging/discharging current saturated voltages (charge_th_high, discharge_th_low). The control table 9 is provided with a data inputter/outputter 10 which permits a user to set various values to be stored in the control table 9 and which is for checking the set values, input/output currents, and other data.

The output current controller 6 changes the charging/discharging currents (Output Current) of the power converter device 5 at the side of the electric energy storage element side in accordance with a detected line voltage (Line_Voltage), the charging rate SOC, and a charging/discharging characteristic set in the control table 9. An explanation will now be given of the charging/discharging characteristic set in the control table 9 with reference to FIGS. 2 to 4.

Figure 2:
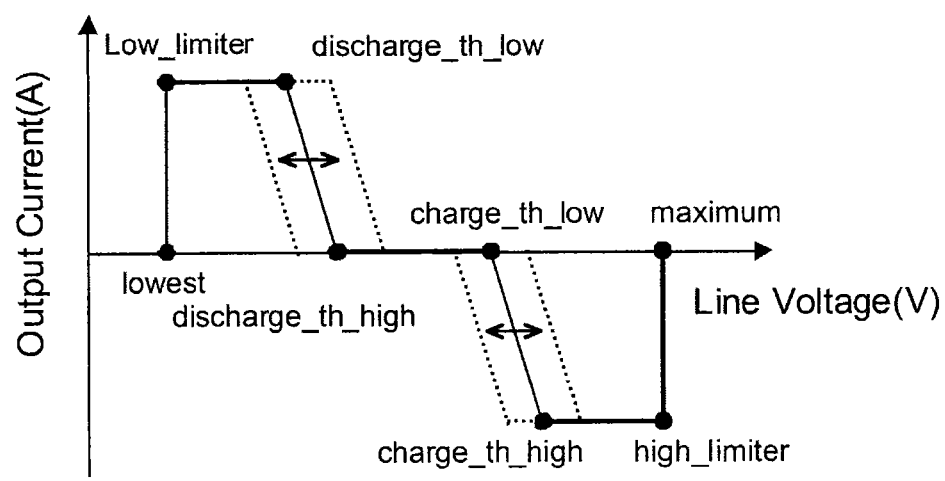
FIG. 2 is a graph indicating a relationship between a line voltage and an output current according to the first embodiment.

FIG. 2 illustrates a relationship between the line voltage (Line_Voltage) that is a horizontal axis and an output current (Output Current) of the electric energy storage element 4 that is a vertical axis. That is, when the line voltage becomes lower than a preset value (the center of the graph horizontal axis) and reaches the discharging start voltage (discharge_th_high), the output current from the electric energy storage element 4 increases, and after the line voltage reaches the discharging current saturated voltage (discharge_th_low), the discharging current maintained at the maximum value is kept being output.

Conversely, when the line voltage becomes higher than the preset value (center of the graph horizontal axis) and reaches the charging start voltage (charge_th_low), the charging current to the electric energy storage element 4 increases, and after the line voltage reaches the charging current saturated voltage (charge_th_high), charging is performed with the charging current being maintained at the maximum value.

Figure 3:
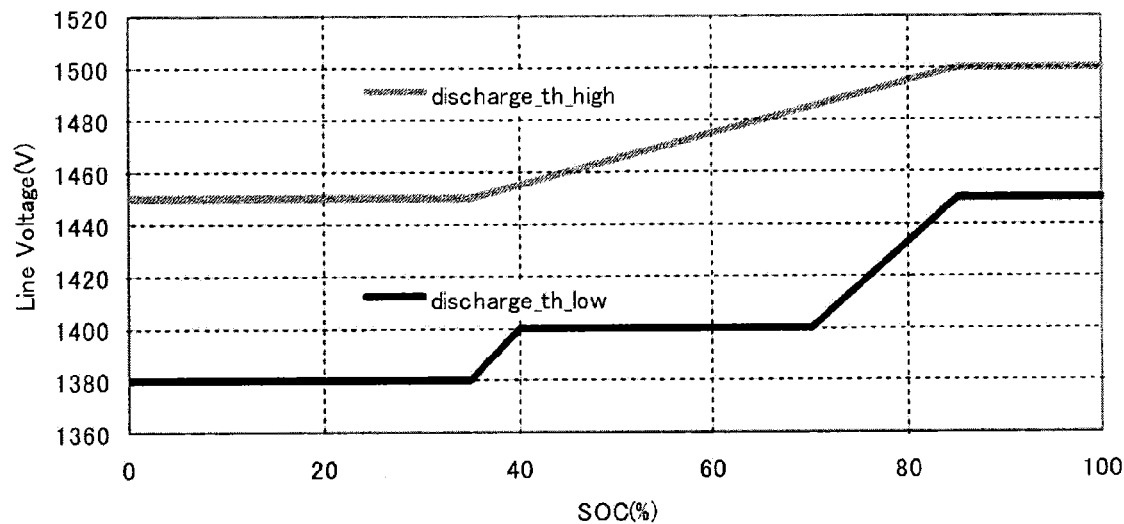
FIG. 3 is a graph indicating a discharging characteristic according to the first embodiment.

FIG. 3 illustrates an example of discharging characteristic based on the line voltage (Line_Voltage) and the charging rate SOC. As illustrated in FIG. 3, according to this embodiment, the charging characteristic (discharge_th_high, discharge_th_low) is set within a line voltage range from 1380 V to 1500 V. In this case, the discharging start voltage (discharge_th_high) is set to be low at a lower range of the charging rate (equal to or lower than 40% in the figure) so as not to start discharging as long as the line voltage does not become low. Likewise, the discharging current saturated voltage (discharge_th_low) is set to be low at a lower range of the charging rate (equal to or lower than 40% in the figure) so as to cause the maximum discharging current to flow at the low line voltage. As a result, setting is made in such a way that no discharging is performed at the lower range of the charging rate as long as the line voltage does not become low (equal to or lower than 1450 V).

Conversely, at a higher range of the charging rate (equal to or greater than 85% in the figure), the discharging start voltage (discharge_th_high) is set to be high (1450 V) so as to start discharging even the line voltage is high. Likewise, at the higher range of the charging rate (equal to or greater than 85% in the figure), the discharging current saturated voltage (discharge_th_low) is set to be high so as to allow the maximum discharging current to flow at a high line voltage (1500 V).

Figure 4:
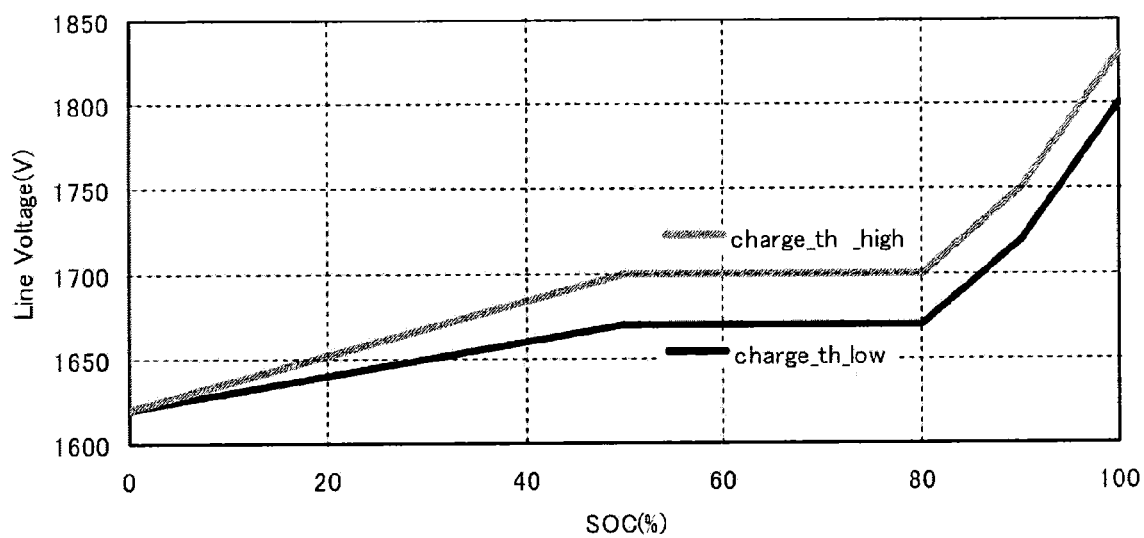
FIG. 4 is a graph illustrating a charging characteristic according to the first embodiment.

FIG. 4 is an example of discharging characteristic based on the line voltage (Line_Voltage) and the charging rate SOC. As illustrated in FIG. 4, a characteristic is set in such a way that the set values of the charging start voltage (charge_th_low) and the charging current saturated voltage (charge_th_high) become high as the charging rate becomes high, and the set values become low as the charging rate becomes low relative to the line voltage. As a result, when the charging rate of the electric energy storage element 4 is low, charging is started although the line voltage is low, and when the charging rate is high, no charging is performed unless the line voltage becomes high.

According to this embodiment, within the all range of the charging rate, the highest value of the discharging start voltage (discharge_th_high) in FIG. 3 is 1500 V, and the lowest value of the charging start voltage (charge_th_low) in FIG. 4 is 1620 V. That is, according to this embodiment, regardless of the range of the charging rate being present, no charging/discharging is performed at least within a range where the line voltage is from 1500 V to 1620 V.

Figure 11:
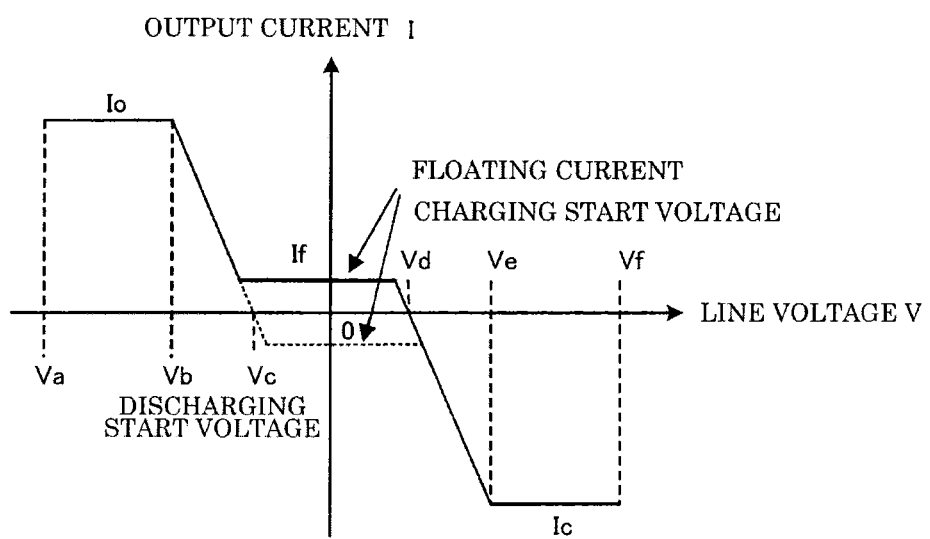
FIG. 11 is a graph indicating a relationship between a line voltage of a conventional technology with a floating control mode and an output current.

The above-explained charging/discharging characteristics of this embodiment illustrated in FIGS. 3 and 4 are indicated by dotted lines in the graph of FIG. 2. As is clear from the dotted lines, according to this embodiment, when the charging rate SOC of the electric energy storage element changes, unlike the conventional technology illustrated in FIG. 11, no floating current If is caused to flow within a portion from the discharging start voltage (discharge_th_high) to the charging start voltage (charge_th_low). According to this embodiment, at least one of the charging start voltage (discharge_th_high) and the charging start voltage (charge_th_low) is changed in accordance with the charging rate. Accordingly, the output current controller 6 refers to the control table in FIG. 3 or FIG. 4, terminates charging/discharging operations when the line voltage is within a range from the discharging start voltage (discharge_th_high) to the charging start voltage (charge_th_low), and can perform appropriate charging/discharging operations in accordance with the charging rate SOC and the line voltage within a range where the line voltage is higher than a rated voltage by a preset voltage or is lower than the rated voltage by the preset voltage.

(Action and Advantage of First Embodiment)

As explained above, according to this embodiment, the characteristic transitions so as to facilitate discharging even at a high line voltage as the charging rate becomes high, and to cause less charging at the low line voltage. Conversely, as the charging rate becomes low, the characteristic transitions so as to cause less discharging at the low line voltage, and to facilitate charging at the low line voltage.

As a result, according to this embodiment, charging/discharging operations, like the floating current control, become unnecessary within a range where charging/discharging is not needed essentially. Frequent charging/discharging to the electric energy storage element is suppressed, thereby accomplishing the energy saving and the longer lifetime. That is, since the conventional adjustment of charging/discharging, like the floating control, is not performed, no waste charging/discharging cycle energy is produced, thereby extending the lifetime of the electric energy storage element.

Moreover, charging is preferentially performed from a voltage range where regeneration is highly possibly canceled (e.g., when the rated line voltage of the feeder line is DC 1500 V, a range from 1650 V to 1800 V), and discharging is intensively performed at a range where the feeder voltage becomes low, excessive regenerative energy can be absorbed, and a power feeding loss in the feeder system (a loss caused in the feeder line and in a rail where a return current flows) can be suppressed.

(Modified Example of First Embodiment)

The above-explained first embodiment may employ the following modified example.

(1) According to this embodiment, it is not always necessary to change both of the charging start voltage (charge_th_low) and the discharging start voltage (discharge_th_high)

in accordance with the charging rate. Either one voltage may be maintained as a fixed value, and the other of the charging start voltage (charge_th_low) or the discharging start voltage (discharge_th_high) may be changed in accordance with the charging rate. The same advantage can be also accomplished in this case.

(2) When the set values of the charging current saturated voltage (charge_th_high) and the charging start voltage (charge_th_low) are set to be equal to or lower than a no-load feeding voltage of a transformer station regardless of the charging rate SOC, charging from the transformer station in a slightly-loaded condition is enabled. This is effective for a line where regenerative energy level is extremely low, and charging can be performed in advance when the feeder system is in a slightly-loaded condition.

(3) Contrary to the above-explained (2), in the case of a system in which regenerative energy can be expected, the set values can be set to be equal to or higher than the no-load feeding voltage of a transformer station, and thus the charging rate can be adjusted by charging based on only the regenerative energy. This suppresses a charging and discharging of feeder energy of the transformer station to the electric energy storage element in a case that no regenerative energy from a train is present, thereby suppressing a deterioration of the feeder efficiency.

(4) The discharging current saturated voltage (discharge_th_low) and the discharging start voltage (discharge_th_high) are set to be active at a voltage equal to or lower than a feeder line rated voltage (e.g., 1500 V in the case of a feeder system of DC 1500 V). By this, the discharging is intensively performed in a condition in which the line voltages really drops largely so as to compensate the line voltage drop, thereby reducing the feeder loss.

(5) In order to decrease the loss of the power converter device 5 at the side of the electric energy storage element 4 between line voltages where no charging/discharging is performed (from discharging start voltage (discharge_th_high) to charging start voltage (charge_th_low)) to accomplish the energy saving, the booster/step-down chopper circuit of the power converter device 5 may be subjected to gate blocking.

[B. Second Embodiment]

Figure 5:
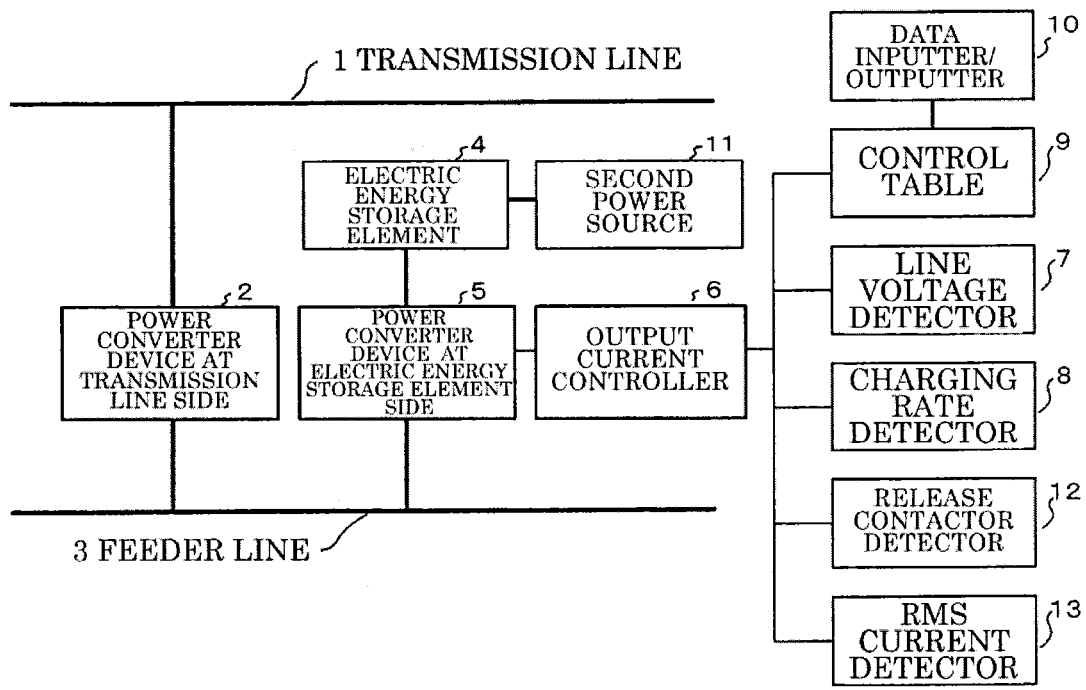
FIG. 5 is a block diagram illustrating a second embodiment.

FIG. 5 illustrates a second embodiment. According to the second embodiment, a second power source 11 is connected to the electric energy storage element 4. As an example of the second power sources 11, power generators, such as solar power generator may be used, wind power generator, and hydro-power generator. Both DC power source and AC power source are available as the second power source 11. In the case of the DC power source, the output power thereof is directly input into the electric energy storage element 4. When the second power source is an AC power source, an AC power obtained by rectifying an original output power is supplied to the electric energy storage element 4.

When power is supplied to the electric energy storage element 4 from the second power source 11, like the above-explained first embodiment, the output current controller 6 adjusts the charging/discharging characteristics from the feeder line 3 in accordance with the charging rate SOC and the line voltage detected by the detectors 7 and 8, and the set values in the control table 9. That is, direct connection of the second power source 11 to the electric energy storage element 4 causes the charging rate of the electric energy storage element 4 to be changed from moment to moment by the power from the second power source 11. In the embodiment illustrated in FIG. 5, the output current controller 6 refers to both charging rate changing from moment to moment as well as changing line voltage so as to control charging/discharging. Accordingly, the same advantage as that of the first embodiment can be expected. In particular, the power from the second power source 11 can be used for compensating the feeder voltage, the feeder loss is further reduced, and the energy saving effect can be further enhanced.

Figure 6:
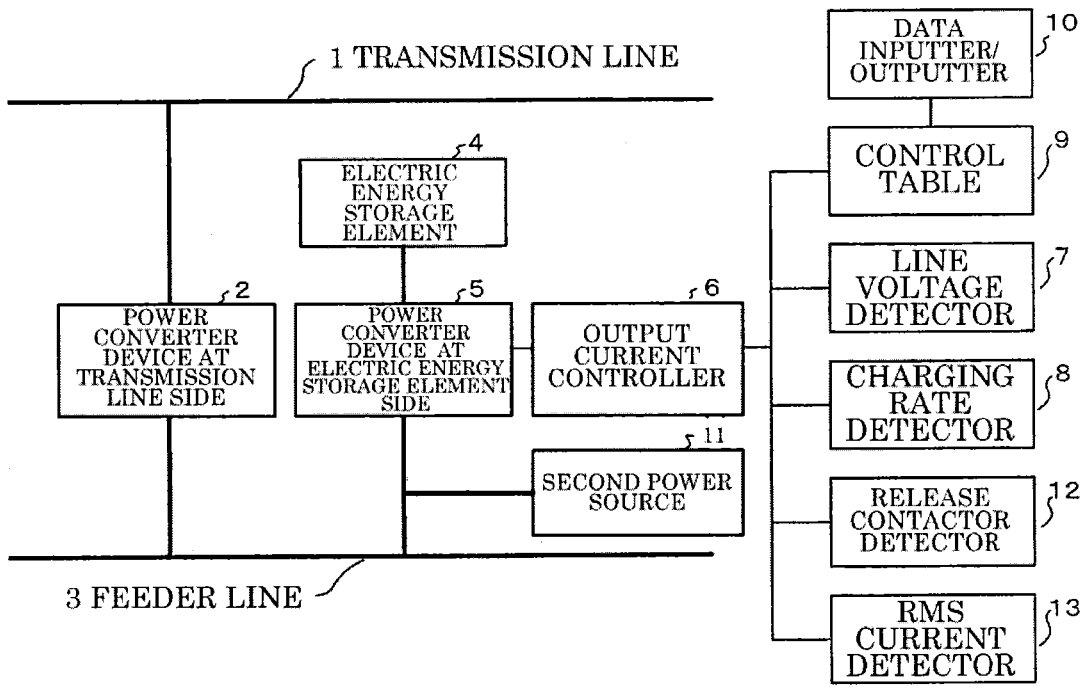
FIG. 6 is a block diagram illustrating a modified example of the second embodiment.

In the second embodiment, the second power source 11 must not be directly connected to the electric energy storage element 4. As illustrated in FIG. 6, the second power source 11 can be connected to the DC feeder line 3 connected with the electric energy storage element 4 near the electric energy storage element 4. In this case, the second power source 11 accomplishes the same function as a regenerative vehicle connected to the feeder line 3, and the same advantage as that of the first embodiment can be expected.

[C. Third Embodiment]

Figure 7:
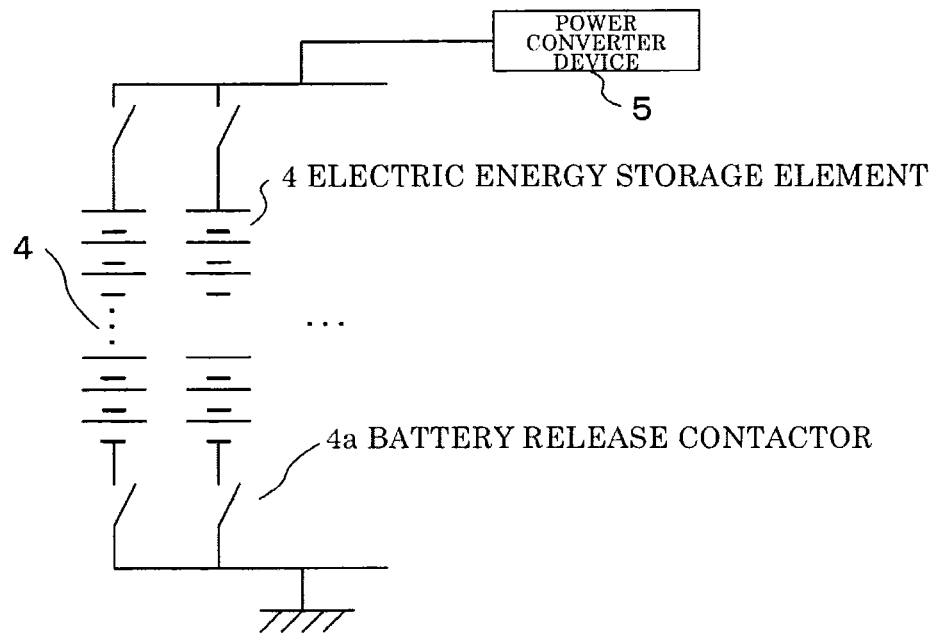
FIG. 7 is a wiring diagram illustrating a connection structure of an electric energy storage element according to each embodiment.

In the respective embodiments explained above, the electric energy storage element 4 can be configured by a plurality of electric energy storage elements. More specifically, as illustrated in FIG. 7, a large number of electric energy storage elements 4 (hereinafter, referred to as an electric energy storage element module) connected in series are connected in multiple rows in parallel. In this case, each electric energy storage element module may be configured to be released from the system through a release contactor 4a. However, in order to detect how many modules are released among the plurality of electric energy storage element modules, as illustrated in FIG. 1, a detector 12 is connected to the output current controller 6, and the output current controller 6 restricts charging/discharging currents supplied to the power converter device 5 for the electric energy storage elements in accordance with the number of detected modules.

More specifically, the output current is restricted by multiplying the output current instruction generated by the output current controller 6 by a value obtained by dividing the number of parallel rows of the electric energy storage element modules after the release by the number of parallel rows of the electric energy storage element modules connected before the release. Accordingly, the modules can be kept in use without increasing the temperature of each electric energy storage element configuring the module. Moreover, an output current instruction in accordance with the number of released electric energy storage element modules may be stored in the control table 9 in advance as a database, and the database may be referred in accordance with the number of released electric energy storage element modules to determine the maximum output current.

The output current instruction of the power converter device 5 by the output current controller 6 may be restricted by the output current controller based on the RMS (effective value) current of the electric energy storage element 4, the RMS current of the power converter device 5, and a temperature detected at the electric energy storage element 4. For example, regarding the above-explained RMS current, an integration cycle of the RMS current may be set for each time slot to calculate the RMS current. The regenerative vehicle basically connected to the feeder line has a cyclic nature in its operation diagram, and thus an RMS current having that diagram cycle as an integration time period can be calculated.

Figure 8:
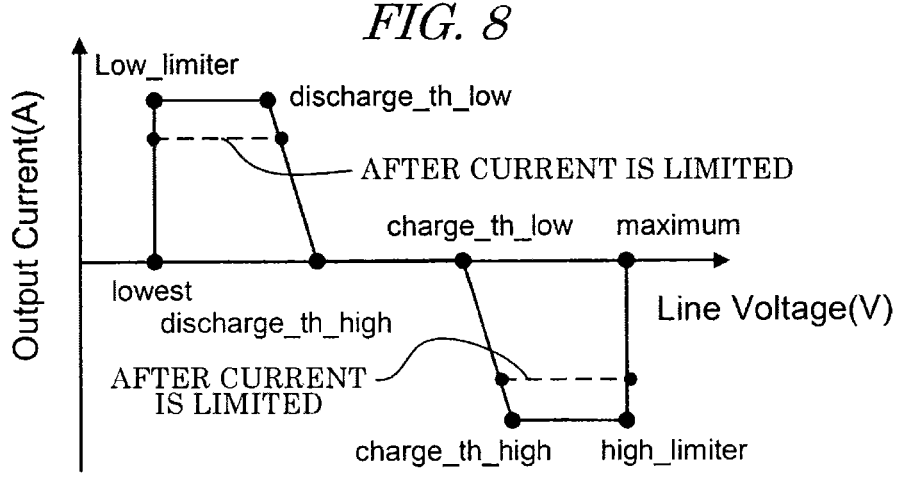
FIG. 8 is a graph indicating a restricted characteristic of input/output currents according to a third embodiment.

In this case, the output current controller 6 is provided with an RMS current detector 13 for the electric energy storage element 4 or the power converter device 5 as illustrated in FIG. 1. Furthermore, a characteristic is set in the control table 9, the characteristic restricting the charging/discharging currents of the electric energy storage element 4 as the detected RMS current becomes close to a preset value set in advance. More specifically, as is indicated by the dotted lines in FIG. 8, the characteristic that restricts a discharging stop voltage (Low_Limiter), the discharging current saturated voltage (discharge_th_low), the charging start voltage (charge_th_low), the charging current saturated voltage (charge_th_high), and a charging stop voltage (high_Limiter) is set in the control table 9.

The current limiting characteristic on the basis of the RMS current may be changed in accordance with the temperature of the electric energy storage element and an external temperature. That is, the characteristic in FIG. 8 differs for each temperature of the electric energy storage element and each external temperature, and therefore different charging/discharging characteristics can be set for each temperature. Accordingly, even if the battery temperature and the external temperature rise, it does not deteriorate the lifetime of the electric energy storage element.

[D. Fourth Embodiment]

Figure 9:
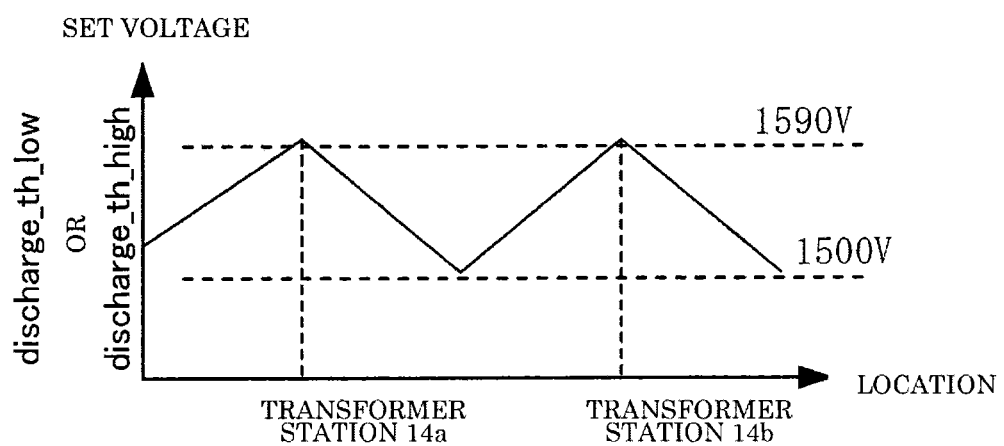
FIG. 9 is a graph indicating a relationship between an installation location of an electric energy storage device and a charging/discharging control characteristic according to a fourth embodiment.

The electric energy storage device of this embodiment can be installed at an arbitrary location. According to a fourth embodiment illustrated in FIG. 9, however, the electric energy storage device located closer to a feeder transformer station, the discharging current saturated voltage (discharge_th_low) or the discharging start voltage (discharge_th_high) are set to be a higher value on the line voltage axis. That is, FIG. 9 illustrates an example of a feeder system of rated DC 1500 V, and the electric energy storage devices located near the feeder transformer stations 14a and 14b have the discharging current saturated voltage (discharge_th_low) or the discharging start voltage (discharge_th_high) set to be 1590 V. In contrast, the electric energy storage devices located at distant locations from the feeder transformer stations 14a and 14b have the discharging current saturated voltage (discharge_th_low) or the discharging start voltage (discharge_th_high) set to be 1500V.

As a result, the location on the feeder line 3 having the larger feeder voltage drop and distant from the feeder transformer station has lower discharging current saturated voltage or the discharging start voltage to the feeder line 3 from the electric energy storage device, thereby compensating the voltage drop of the feeder line 3.

[E. Fifth Embodiment]

Figure 10:
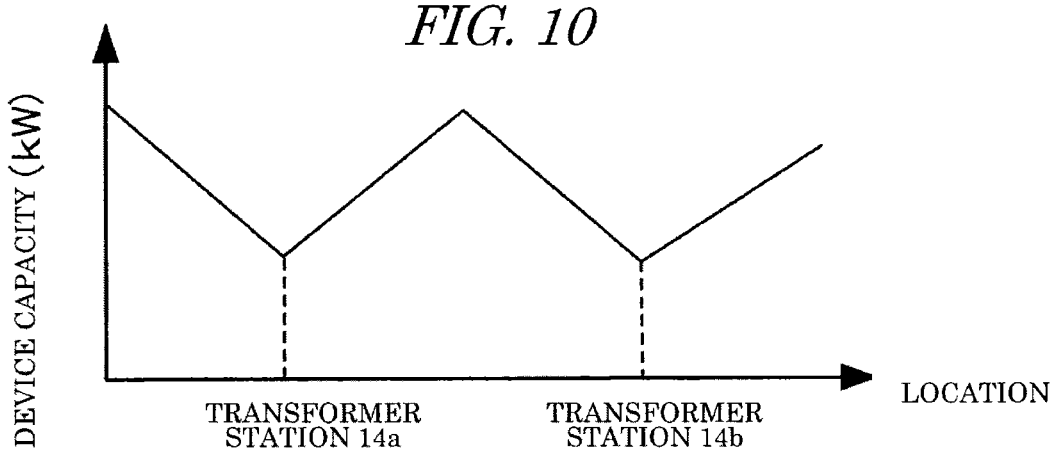
FIG. 10 is a graph indicating a relationship between an installation location of an electric energy storage device and a capacity of electric energy storage device according to a fifth embodiment.

A fifth embodiment illustrated in FIG. 10 causes the electric energy storage device to have a larger capacity as becoming more distant from the feeder transformer stations 14a, 14b. According to such a fifth embodiment, the feeder loss caused by the flow of the feeder current can be reduced, thereby enhancing the energy saving effect. In this case, regarding the way of increasing the capacity of the electric energy storage device, the more distant the electric energy storage device is from the transformer station, the larger the number of electric energy storage device operated in parallel becomes, thereby increasing the capacity.

Moreover, each electric energy storage device of this embodiment may be installed at a station, and in this case, the electric energy storage device having a larger capacity is installed at a station having a larger number of stopping trains, thereby accomplishing a large energy saving effect. Conversely, when the large-capacity and high-output electric energy storage device is installed at a station having a small number of stopping trains, the regenerative energy of the distant train is excessively absorbed, and thus the energy saving effect is deteriorated due to the increase of the feeder line loss. Hence, by installing the electric energy storage device having a larger capacity and a high output at a station having a larger number of stopping trains, the reduction effect of the feeder line loss can be enhanced, thereby realizing an effective energy saving of the feeder system.

[F. Other Embodiments]

The above-explained embodiments are exhibited by way of example only in this specification, and are not intended to limit the scope of the present disclosures. That is, it can be carried out in other various forms, and various omission, substitutions and changes may be made without departing from the spirit of the present disclosures. The accompanying claims and their equivalents are intended to cover such forms or modifications as would fall within the scope and spirit of the disclosures.

In particular, the respective embodiments explained above utilize the feeder line connected with a regenerative railroad vehicle as the DC power source, but the present disclosure is applicable to DC distributing systems other than the feeder system of the DC electric railroad, such as a distributing system to a drive system of an elevator, and charging/discharging systems of a solar power generator (PV).

DESCRIPTION OF REFERENCE NUMERALS

1 Transmission line
2 power converter device at the side of the transmission line
3 Feeder line
4 Electric energy storage element
4a Release contactor
5 power converter device at the side of the electric energy storage element
6 Output current controller
7 Line voltage detector
8 Charging rate detector
9 Control table
10 Data inputter/outputter
11 Second power source
12 Detector for release contactor
13 RMS current detector
14a, 14b Feeder transformer station

What is claimed is:
1. An electric energy storage device comprising:
an electric energy storage element connected to a DC power source via a power converter device; and
an output current controller which is connected to the power converter device and which controls charging/discharging current of the electric energy storage element relative to the DC power source,
the output current controller being connected with a voltage detector that detects a voltage of the DC power source, a charging rate detector that detects a charging rate of the electric energy storage element, and a control table having set therein charging/discharging characteristics for setting at least one of a charging start voltage, a discharging start voltage, a charging current saturated voltage and a discharging current saturated voltage of the electric energy storage element based on the voltage of the DC power source detected by the voltage detector and the charging rate of the electric energy storage element detected by the charging rate detector, and
the charging/discharging characteristics stored in the control table being set such that at least one of the charging start voltage, the discharging start voltage, the charging current saturated voltage and the discharging current saturated voltage is set to a higher value at higher charging rate of the electric energy storage element than at lower charging rate thereof.

2. The electric energy storage device according to claim 1, wherein
- a power source voltage from the DC voltage is supplied through the power converter device that converts AC voltage to DC voltage,
- a no-load feeding voltage of the DC power source changes in accordance with a change in the AC voltage, and
- the charging/discharging characteristics stored in the control table is set such that the DC voltage of the DC power source performing a charging operation to the electric energy storage element is set to be higher than the voltage of the DC power source changed in accordance with the voltage change in the AC voltage.

3. The electric energy storage device according to claim 2, wherein a rated voltage of the DC power source is a DC power source voltage when the power converter device that is a voltage source of the DC power source is outputting a current that enables a continuous operation.

4. The electric energy storage device according to claim 1, wherein the power converter device connected to the electric energy storage element comprises a plurality of power converters connected in parallel.

5. The electric energy storage device according to claim 1, wherein
- the power converter device connected to the electric energy storage element is a power converter device that operates through a gate drive on a switching element, and
- the gate drive is terminated when the voltage of the DC power source is lower than the no-load feeding voltage and is higher than the rated voltage of the DC power source.

6. The electric energy storage device according to claim 1, wherein a second power source is connected to at least one of the electric energy storage element and the DC power source.

7. The electric energy storage device according to claim 1, wherein the DC power source is a feeder line connected to a transformer station and a regenerative train.

8. The electric energy storage device according to claim 1, further comprising:
- a plurality of electric energy storage element series modules each including a plurality of the electric energy storage elements connected in series, the plurality of electric energy storage element series modules being connected in parallel;
- a release contactor provided between each of the plurality of electric energy storage element series modules connected in parallel and the power converter device; and
- a release contactor detector which detects a number of released electric energy storage element series module and which is provided at the output current controller,
- wherein the output current controller limits charging/discharging currents in accordance with the number of electric energy storage element series modules detected by the release contactor detector.

9. The electric energy storage device according to claim 1, further comprising a detector which detects at least one of a temperature of the electric energy storage element, an RMS current, and an external temperature and which is provided at the output current controller,
- wherein the output current controller limits charging/discharging currents in accordance with at least one value of the temperature of the electric energy storage element, the RMS current, and the external temperature detected by the detector.

10. The electric energy storage device according to claim 2, wherein
- the power converter device connected to the electric energy storage element is a power converter device that operates through a gate drive on a switching element, and
- the gate drive is terminated when the voltage of the DC power source is lower than the no-load feeding voltage and is higher than the rated voltage of the DC power source.

11. The electric energy storage device according to claim 2, wherein the DC power source is a feeder line connected to a transformer station and a regenerative train.

12. The electric energy storage device according to claim 2, further comprising:
- a plurality of electric energy storage element series modules each including a plurality of the electric energy storage elements connected in series, the plurality of electric energy storage element series modules being connected in parallel;
- a release contactor provided between each of the plurality of electric energy storage element series modules connected in parallel and the power converter device; and
- a release contactor detector which detects a number of released electric energy storage element series module and which is provided at the output current controller,
- wherein the output current controller limits charging/discharging currents in accordance with the number of electric energy storage element series modules detected by the release contactor detector.

13. The electric energy storage device according to claim 2, further comprising a detector which detects at least one of a temperature of the electric energy storage element, an RMS current, and an external temperature and which is provided at the output current controller,
- wherein the output current controller limits charging/discharging currents in accordance with at least one value of the temperature of the electric energy storage element, the RMS current, and the external temperature detected by the detector.

* * * * *